(12) United States Patent
Shaw

(10) Patent No.: US 9,936,354 B2
(45) Date of Patent: *Apr. 3, 2018

(54) COMMUNICATION COVERAGE NAVIGATION

(71) Applicant: AT&T Intellectual Property I, L.P., Atlanta, GA (US)

(72) Inventor: Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/407,897

(22) Filed: Jan. 17, 2017

(65) Prior Publication Data
US 2017/0127240 A1 May 4, 2017

Related U.S. Application Data

(60) Continuation of application No. 14/863,954, filed on Sep. 24, 2015, now Pat. No. 9,565,571, which is a division of application No. 13/683,123, filed on Nov. 21, 2012, now Pat. No. 9,154,641.

(51) Int. Cl.
H04W 4/02 (2009.01)
H04L 29/08 (2006.01)
G01C 21/34 (2006.01)
H04W 88/02 (2009.01)

(52) U.S. Cl.
CPC ............ *H04W 4/028* (2013.01); *G01C 21/34* (2013.01); *H04L 67/306* (2013.01); *H04W 4/023* (2013.01); *H04W 4/027* (2013.01); *H04W 88/02* (2013.01)

(58) Field of Classification Search
CPC ..... H04W 4/028; H04W 12/06; H04W 12/08; H04W 4/027; H04W 4/008; H04W 4/02; H04M 15/58; H04M 15/80; H04M 15/8044; H04M 15/8055; H04M 15/82; H04M 15/8207; H04M 5/8214
See application file for complete search history.

(56) References Cited

U.S. PATENT DOCUMENTS

| 7,079,945 | B1 | 7/2006 | Kaplan |
| 7,821,986 | B2 | 10/2010 | Thomson et al. |
| 8,311,741 | B1 | 11/2012 | Lawther et al. |
| 9,565,571 | B2 * | 2/2017 | Shaw .................. H04L 41/0816 |
| 2009/0247137 | A1 | 10/2009 | Awad |

(Continued)

OTHER PUBLICATIONS

Chitrapu et al., "Cellular Wi-Fi Integration—A comprehensive analysis—Part II," https://www.edn.com/Home/PrintView?contentItemId=4390906, Jul. 23, 2012, 9 pages.

(Continued)

*Primary Examiner* — Diane Mizrahi
(74) *Attorney, Agent, or Firm* — Baker & Hostetler LLP

(57) ABSTRACT

A processor may be configured to access mapping data for a route to a destination, as well as information associated with a mobile device that may include usage data of the mobile device, a user profile associated with the mobile device, or demographic data associated with a user of the mobile device. The route to the destination may be displayed along with an indicator of the predicted coverage for the mobile device along the route.

20 Claims, 14 Drawing Sheets

(56) References Cited

U.S. PATENT DOCUMENTS

| | | |
|---|---|---|
| 2010/0036604 A1 | 2/2010 | O'Connell et al. |
| 2012/0026865 A1 | 2/2012 | Fan et al. |
| 2012/0071168 A1 | 3/2012 | Tomici et al. |
| 2013/0231080 A1 | 9/2013 | Cheuk et al. |
| 2013/0337769 A1 | 12/2013 | Bhatia et al. |
| 2014/0018000 A1 | 1/2014 | Seymour |
| 2016/0021545 A1* | 1/2016 | Shaw ................ H04W 72/048 455/405 |
| 2016/0086391 A1* | 3/2016 | Ricci ................ G07C 5/008 701/29.3 |
| 2016/0381656 A1* | 12/2016 | Bevan ................ H04W 64/00 370/252 |

OTHER PUBLICATIONS

Staring, A. J., "Applying the Cloud Computing Model in LTE based Cellular Systems," 17th Twente Student Conference on IT, Jun. 25, 2012, 9 pages.

* cited by examiner

COMMUNICATION COVERAGE NAVIGATION

CROSS-REFERENCE TO RELATED APPLICATIONS

This application is a continuation of U.S. patent application Ser. No. 14/863,954, filed Sep. 24, 2015, entitled "Communication Coverage Navigation," which is a divisional of U.S. patent application Ser. No. 13/683,123, filed Nov. 21, 2012, entitled "LONG TERM EVOLUTION INTELLIGENT SUBSCRIBER PROFILE." Both applications are incorporated by reference in their entirety.

TECHNICAL FIELD

The technical field generally relates to wireless communications and more specifically relates to directions associated with network resources.

BACKGROUND

Users are expecting data access anywhere for their mobile devices. Current wide are wireless networks, such as Global System for Mobile communications (GSM) and Long Term Evolution (LTE), allow internet service providers to offer reasonable uplink and downlink bandwidth and speed, in which customers can reach Internet based services. For example, cloud computing allows customers to make use of a wide range of cloud based resources such as platform as a service (PaaS), storage as a service (SaaS), computing as a service, and the like. But exponential growth in cloud services and other Internet services has caused a corresponding increase in congestion on wide are wireless networks, which may reduce the effectiveness of cloud and other data services for users.

SUMMARY

The following presents a simplified summary that describes some aspects of the subject disclosure. This summary is not an extensive overview of the disclosure. Indeed, additional or alternative aspects of the subject disclosure may be available beyond those described in the summary.

In an example, a processor may access information associated with a mobile device, the information associated with the mobile device may include a first data usage for a first data session associated with the mobile device. The data may be analyzed in a manner to predict a second data usage for a second data session associated with the mobile device. Ultimately, a network for the mobile device may be configured based on the predicted second data usage for the second data session associated with the mobile device.

In another example, a processor may be configured to access mapping data for a route to a destination, as well as information associated with a mobile device, that includes at least one of usage data of the mobile device, a user profile associated with the mobile device, or demographic data associated with a user of the mobile device. Coverage may be predicted for the mobile device along the route based on an analysis of the information associated with the mobile device and the mapping data for the route. The route to the destination may be displayed along with an indicator of the predicted coverage for the mobile device along the route.

In another example, a system may include a network device and a mobile device, wherein the mobile device is capable of accessing a wide area wireless network domain and alternate network domain. The network device may be configured to access historical information associated with the mobile device, access a current state of the wide area wireless network, and predict the use of the mobile device based on an analysis of the information associated with the mobile device and the current state of the wide area wireless network. The mobile device may be instructed to use the alternate domain network based on the predicted use of the mobile device.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION OF ILLUSTRATIVE EXAMPLES

Figure 1:
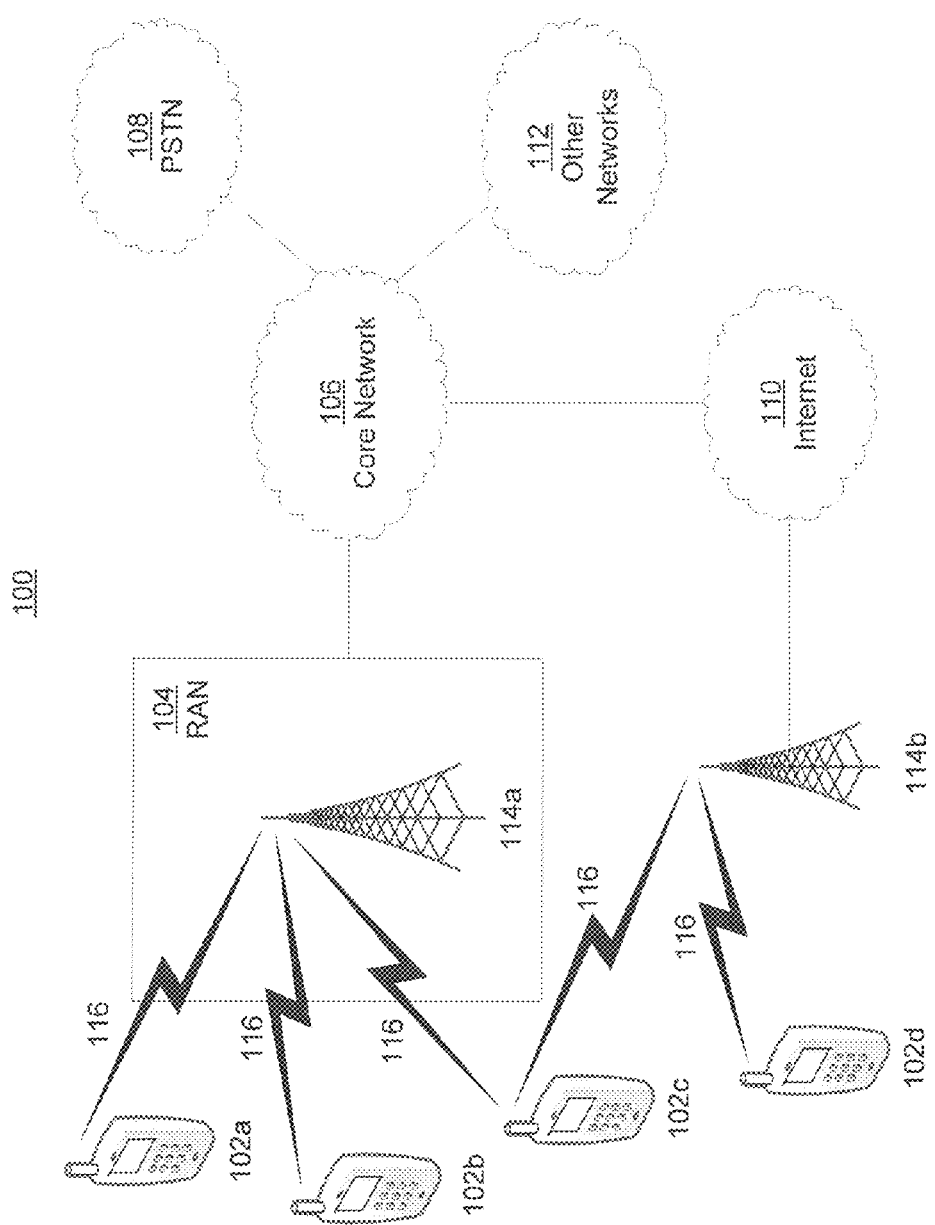
FIG. 1 is a system diagram of an example communications system in which one or more disclosed examples may be implemented.

FIG. 1 is a diagram of an example communications system 100 in which one or more disclosed examples may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. A communications system such as that shown in FIG. 1 may also be referred to herein as a network.

As shown in FIG. 1, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed examples contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a mobile device, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an example, the base station 114a may include three transceivers, i.e., one for each sector of the cell. In another example, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA) that may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another example, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other example, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1 may be a wireless router, Home Node B, Home eNode B, or access point, for example, and may utilize any suitable RAT for facilitating wireless connectivity in a localized area, such as a place of business, a home, a vehicle, a campus, and the like. In one example, the base station 114b and the WTRUs 102c, 102d may implement a radio technology such as IEEE 802.11 to establish a wireless local area network (WLAN). In another example, the base station 114b and the WTRUs 102c, 102d may implement a radio technology such as IEEE 802.15 to establish a wireless personal area network (WPAN). In yet another example, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1 may be configured to communicate with the base station 114a, which may employ a cellular-based radio technology, and with the base station 114b, which may employ an IEEE 802 radio technology.

Figure 2:
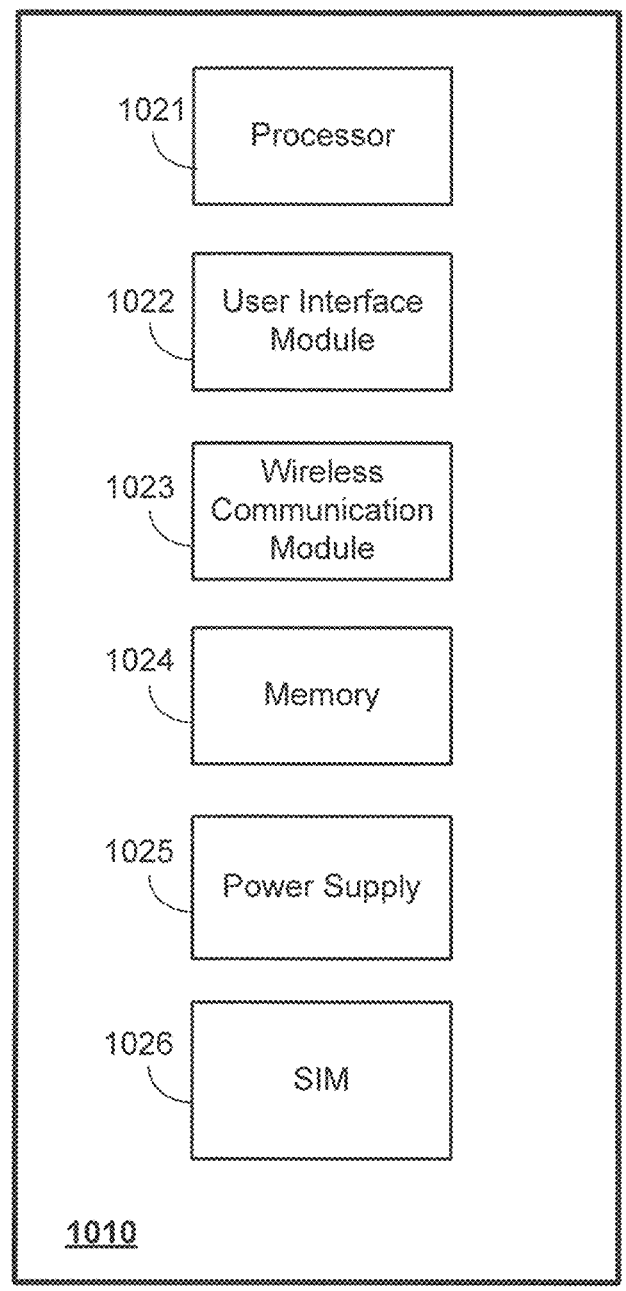
FIG. 2 is a block diagram of a non-limiting exemplary mobile device in which one or more disclosed examples may be implemented.

FIG. 2 illustrates an example wireless device 1010 (i.e., WTRU) that may be used in connection with an example. References will also be made to other figures of the present disclosure as appropriate. For example, mobile devices 102a, 102b, and 102c may be wireless devices of the type described in regard to FIG. 2, and may have some, all, or none of the components and modules described in regard to FIG. 2. It will be appreciated that the components and modules of wireless device 1010 illustrated in FIG. 2 are illustrative, and that any number and type of components and/or modules may be present in wireless device 1010. In addition, the functions performed by any or all of the components and modules illustrated in FIG. 2 may be performed by any number of physical components. Thus, it is possible that in some examples the functionality of more than one component and/or module illustrated in FIG. 2 may be performed by any number or types of hardware and/or software.

Processor 1021 may be any type of circuitry that performs operations on behalf of wireless device 1010. Such circuitry may include circuitry and other components that enable processor 1021 to perform any of the functions and methods described herein. Such circuitry and other components may also enable processor 1021 to communicate and/or interact with other devices and components, for example any other component of device of wireless device 1010, in such a manner as to enable processor 118 and such other devices and/or components to perform any of the disclosed functions and methods. In one example, processor 1021 executes software (i.e., computer readable instructions stored in a computer readable medium) that may include functionality related to dynamic network domain interoperability, for example. User interface module 1022 may be any type or combination of hardware and/or software that enables a user to operate and interact with wireless device 1010, and, in one example, to interact with a system or software enabling the user to place, request, and/or receive calls, text communications of any type, voicemail, voicemail notifications, voicemail content and/or data, and/or a system or software enabling the user to view, modify, or delete related software objects. For example, user interface module 1022 may include a display, physical and/or "soft" keys, voice recognition software, a microphone, a speaker and the like. Wireless communication module 1023 may be any type of transceiver including any combination of hardware and/or software that enables wireless device 1010 to communicate with wireless network equipment. Memory 1024 enables wireless device 1010 to store information, such as APNs, MNCs, MCCs, text communications content and associated data, multimedia content, software to efficiently process radio resource requests and service requests, and radio resource request processing preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 3:
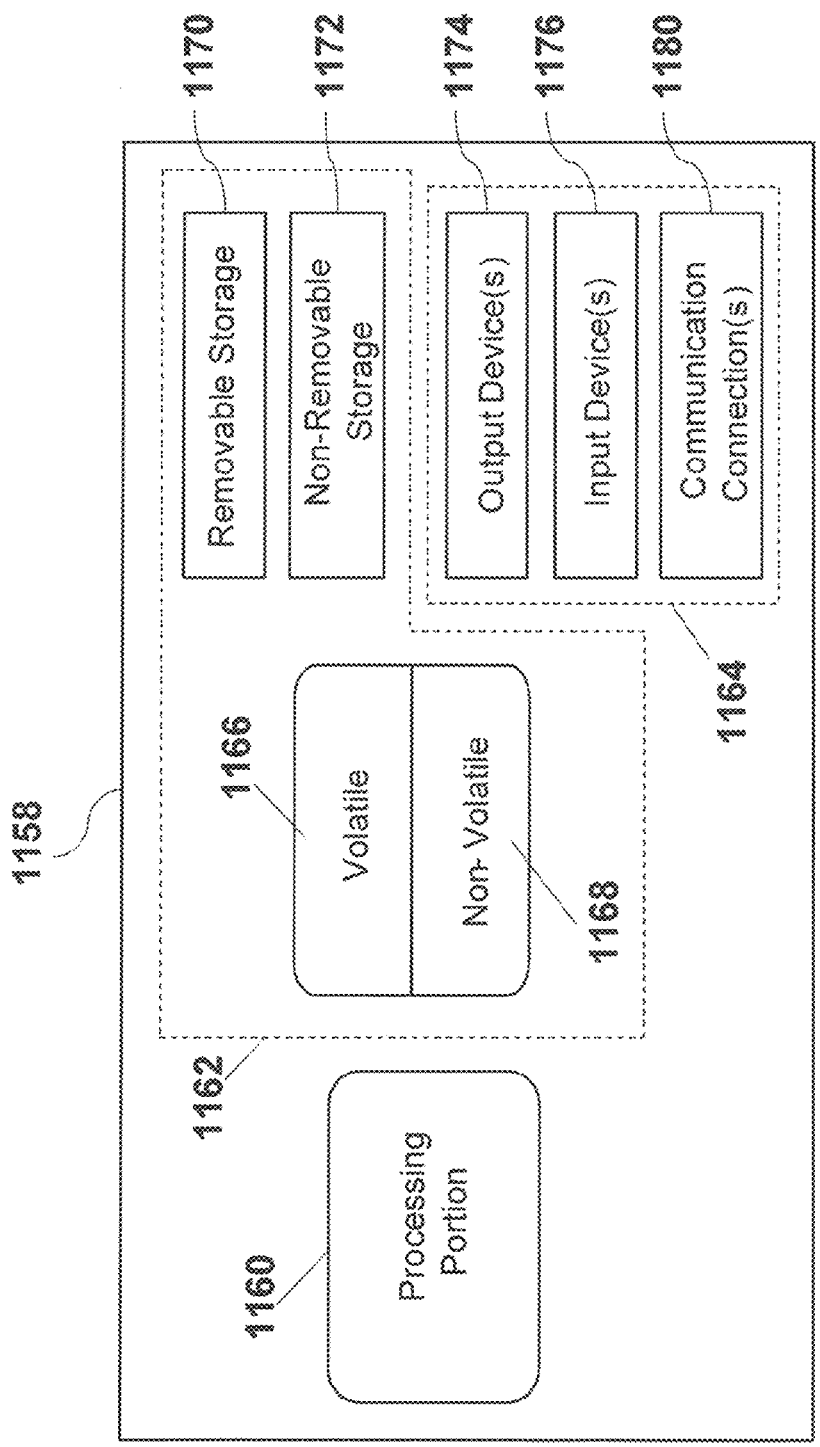
FIG. 3 is a block diagram of a non-limiting exemplary processor in which one or more disclosed examples may be implemented.

FIG. 3 is a block diagram of an example processor 1158 which may be employed in any of the examples described herein, including as one or more components of mobile devices 102a thru 102d, as one or more components of network equipment such as S-GW 1343, PDN Gateway 1345 any other component of networks 1340 and 1330, and/or any related equipment, and/or as one or more components of any third party system or subsystem that may implement any portion of the subject matter described herein. It is emphasized that the block diagram depicted in FIG. 3 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof. Processor 1158 may include circuitry and other components that enable processor 1158 to perform any of the functions and methods described herein. Such circuitry and other components may also enable processor 1158 to communicate and/or interact with other devices and components, for example any other component of any device disclosed herein or any other device, in such a manner as to enable processor 1158 and such other devices and/or components to perform any of the disclosed functions and methods.

As depicted in FIG. 3, the processor 1158 comprises a processing portion 1160, a memory portion 1162, and an input/output portion 1164. The processing portion 1160, memory portion 1162, and input/output portion 1164 are coupled together (coupling not shown in FIG. 3) to allow communications between these portions. The input/output portion 1164 is capable of providing and/or receiving components, commands, and/or instructions, utilized to, for example, request and receive APNs, MNCs, and/or MCCs, establish and terminate communications sessions, transmit and receive service requests and data access request data and responses, transmit, receive, store and process text, data, and voice communications, execute software that efficiently processes radio resource requests, receive and store service requests and radio resource requests, radio resource request processing preferences and configurations, and/or perform any other function described herein.

The processor 1158 may be implemented as a client processor and/or a server processor. In a basic configuration, the processor 1158 may include at least one processing portion 1160 and memory portion 1162. The memory portion 1162 can store any information utilized in conjunction with establishing, transmitting, receiving, and/or processing text, data, and/or voice communications, communications-related data and/or content, voice calls, other telephonic communications, etc. For example, the memory portion is capable of storing APNs, MNCs, MCCs, service requests, radio resource requests, QoS and/or APN parameters, software for dynamic network domain interoperability, intelligent subscriber profiles, text and data communications, calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 may include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the processor 1158. Any such computer storage media may be part of the processor 1158. As described herein, a computer storage media is an article of manufacture and thus not a transient signal.

The processor 1158 may also contain the communications connection(s) 1180 that allow the processor 1158 to communicate with other devices, for example through a radio access network (RAN). Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The operating environments described herein should be considered non-exhaustive, however, and the network architectures merely show how disclosed subject matter (e.g., dynamic network domain interoperability) may be implemented with stationary and non-stationary network structures and architectures. It can be appreciated, however, that disclosed subject matter as described herein may be incorporated with existing and/or future alternative architectures for communication networks as well.

GSM is one of the most widely utilized wireless access systems in today's fast growing communication environment. GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1× Evolution Data Optimized (EVDO), Code Division Multiple Access-2000 (cdma2000 3×), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, the disclosed subject matter (e.g., dynamic network domain interoperability) may be applied independently of the method of data transport and does not depend on any particular network architecture or underlying protocols.

Figure 4:
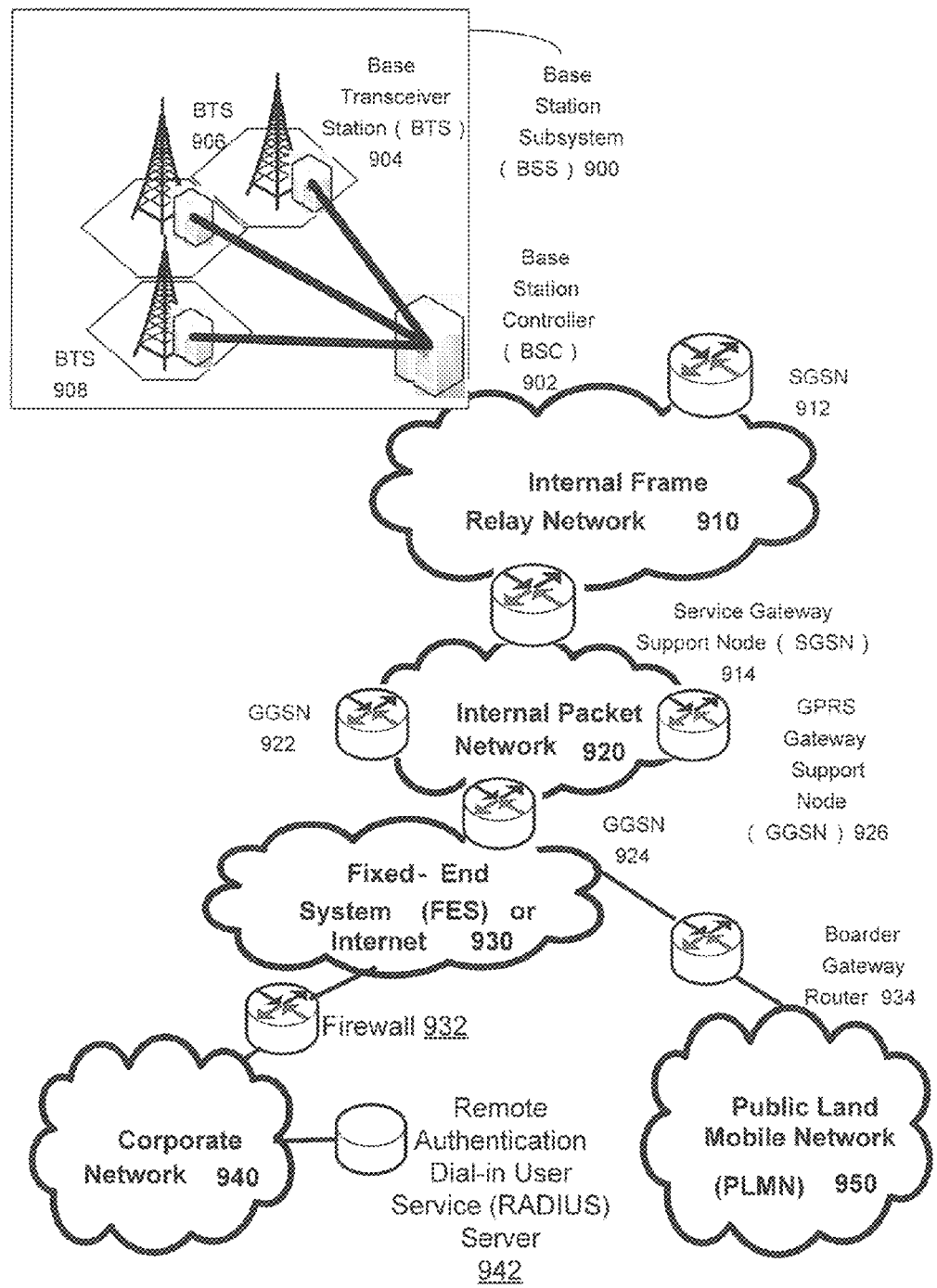
FIG. 4 is a block diagram of a non-limiting exemplary packet-based mobile cellular network environment, such as a GPRS network, in which one or more disclosed examples may be implemented.

FIG. 4 depicts an overall block diagram of an exemplary packet-based mobile cellular network environment, such as a GPRS network, in which the disclosed subject matter (e.g., dynamic network domain interoperability) may be practiced. In an example configuration, any RAN as described herein may be encompassed by or interact with the network environment depicted in FIG. 4. Similarly, mobile devices 102a, 102b, and 102c may communicate or interact with a network environment such as that depicted in FIG. 4. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., mobile devices 102a, 102b, and 102c) become connected to the wireless network. In exemplary fashion, the packet traffic originating from user devices (e.g., mobile devices 102a, 102b, and 102c) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 5:
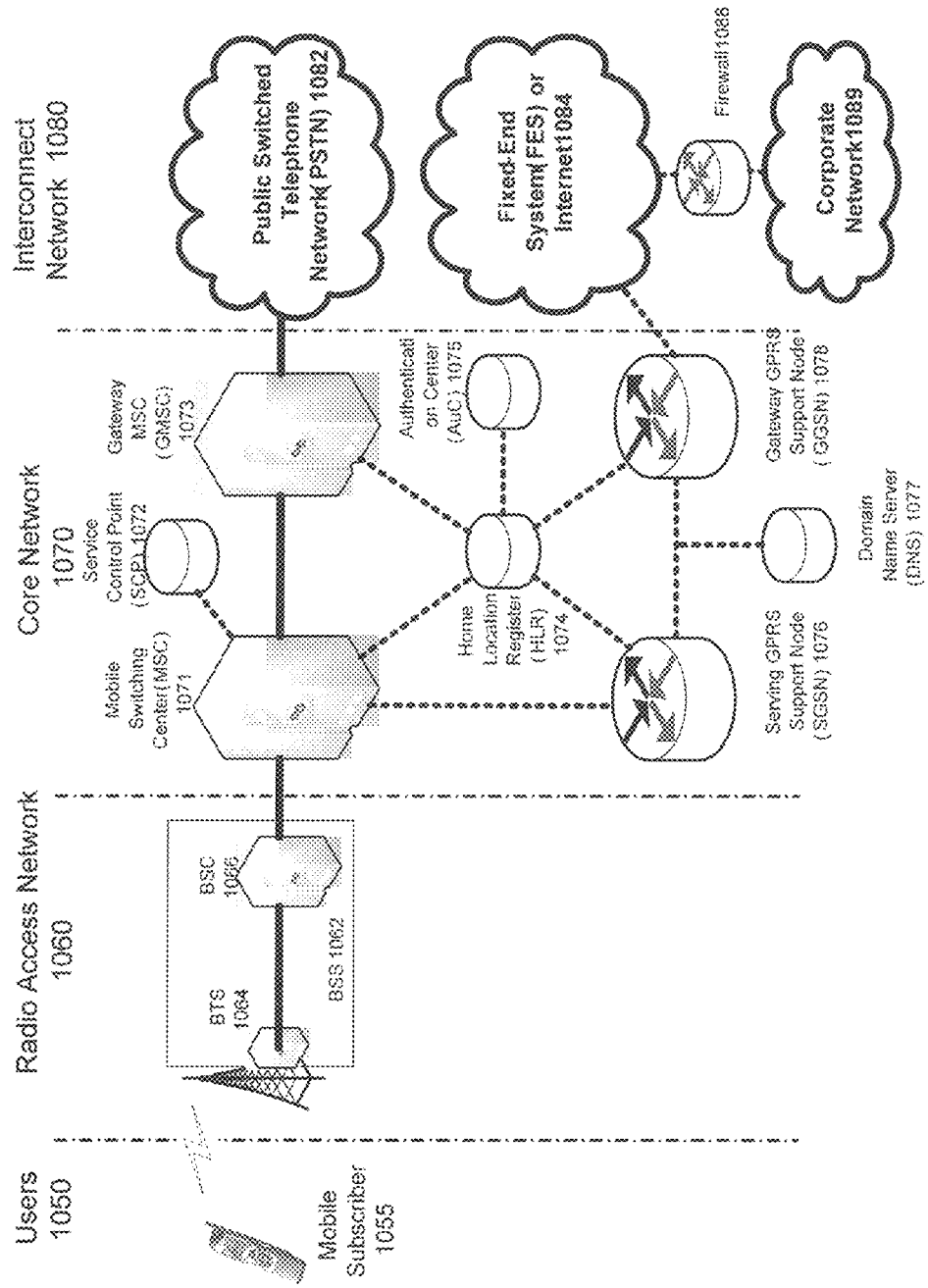
FIG. 5 illustrates a non-limiting exemplary architecture of a typical GPRS network, segmented into four groups, in which one or more disclosed examples may be implemented.

FIG. 5 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 5). In an example, the device depicted as mobile subscriber 1055 may comprise any of mobile devices 102a, 102b, and 102c. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 5, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076 that may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. In some examples, HLR 1074 may be a device such as HSSs. HLR 1074 may store static information about the subscribers such as the International Mobile Subscriber Identity (IMSI), APN profiles as described herein, subscribed services, and a key for authenticating the subscriber. HLR 1074 may also store dynamic subscriber information such as dynamic APN profiles and the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as mobile devices 102a, 102b, and 102c, used by an end user of a mobile cellular service or a wireless provider. When a mobile subscriber turns on his or her mobile device, the mobile device may go through an attach process by which the mobile device attaches to an SGSN of the GPRS network. In FIG. 5, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself to the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to an Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, that may be provisioned to map to one or more GGSN nodes in the core network 1070. Based on the APN, the mapped GGSN 1078 may access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of dynamic network domain interoperability systems and methods and other subject matter described herein may include, but are not limited to, Gateway GPRS Support Node tables, Fixed End System router tables, firewall systems, VPN tunnels, and any number of other network elements as required by the particular digital network.

Figure 6:
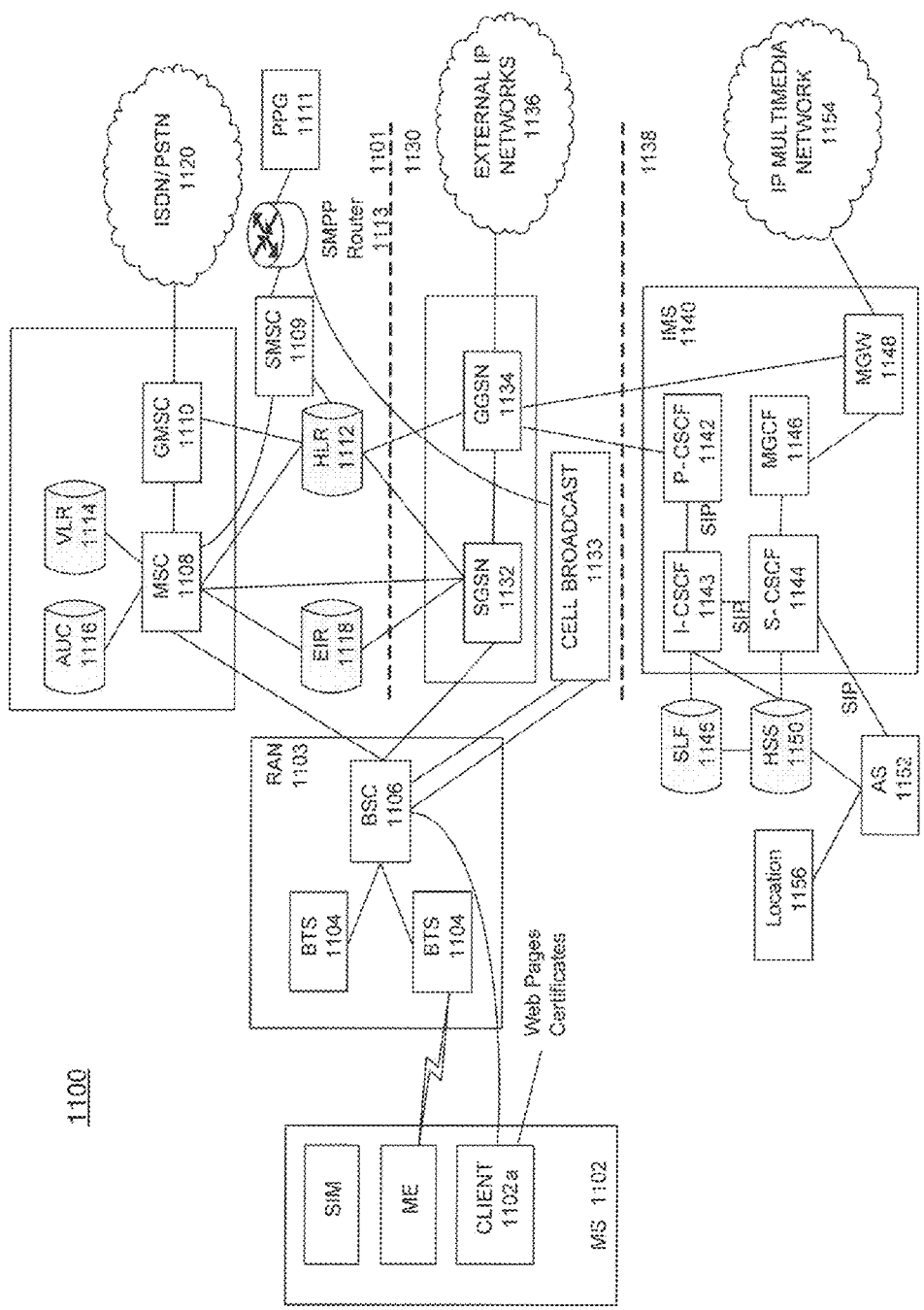
FIG. 6 illustrates a non-limiting alternate block diagram of an exemplary GSM/GPRS/IP multimedia network architecture in which one or more disclosed examples may be implemented.

FIG. 6 illustrates another exemplary block diagram view of a GSM/GPRS/IP multimedia network architecture 1100 in which the dynamic network domain interoperability systems and methods and other subject matter described herein may be incorporated. As illustrated, architecture 1100 of FIG. 6 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., mobile devices 102a, 102b, and 102c) that is used by mobile subscribers, in one example with a Subscriber identity Module (SIM). The SIM includes an International Mobile Subscriber Identity (IMSI), which is a unique identifier of a subscriber. The SIM may also include APNs. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that may contain administrative information regarding each subscriber registered in a corresponding GSM network. Such information may include APNs and APN profiles. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct an MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS may be receiving data and may not be listening to a paging channel. In a NOM3 network, a MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138. HSS 1150 may include multiple HSSs.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision may be based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

Figure 7:
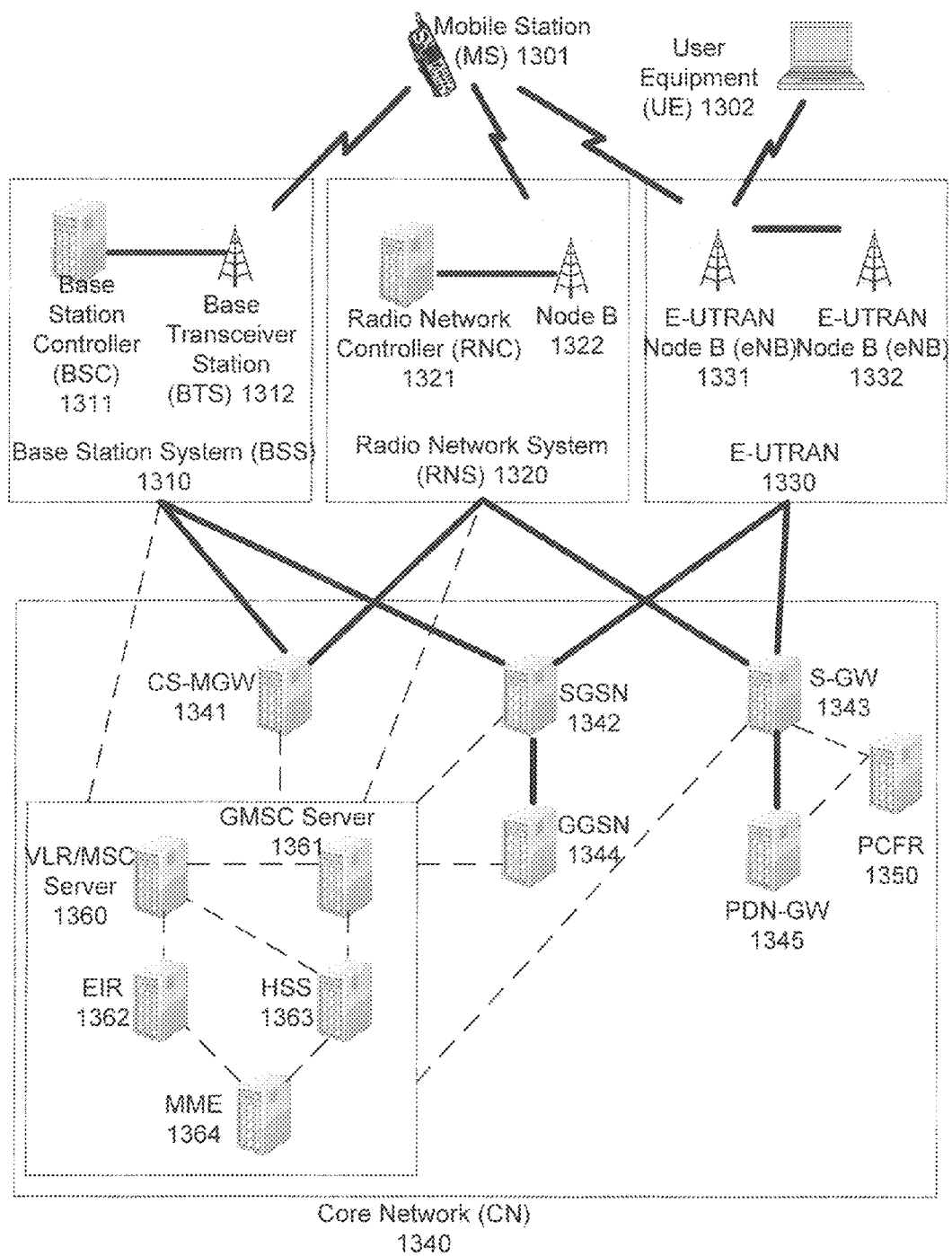
FIG. 7 illustrates a Public Land Mobile Network (PLMN) block diagram view of an exemplary architecture in which one or more disclosed examples may be implemented.

FIG. 7 illustrates a PLMN block diagram view of an exemplary architecture in which dynamic network domain interoperability systems and methods and other subject matter described herein may be incorporated. Mobile Station (MS) 1301 is the physical equipment used by the PLMN subscriber. In one illustrative example, communications device 40 may serve as Mobile Station 1301. Mobile Station 1301 may be one of, but not limited to, a cellular telephone, a cellular telephone in combination with another electronic device or any other wireless mobile communication device.

Mobile Station 1301 may communicate wirelessly with Base Station System (BSS) 1310. BSS 1310 contains a Base Station Controller (BSC) 1311 and a Base Transceiver Station (BTS) 1312. BSS 1310 may include a single BSC 1311/BTS 1312 pair (Base Station) or a system of BSC/BTS pairs which are part of a larger network. BSS 1310 is responsible for communicating with Mobile Station 1301 and may support one or more cells. BSS 1310 is responsible for handling cellular traffic and signaling between Mobile Station 1301 and Core Network 1340. Typically, BSS 1310 performs functions that include, but are not limited to, digital conversion of speech channels, allocation of channels to mobile devices, paging, and transmission/reception of cellular signals.

Additionally, Mobile Station 1301 may communicate wirelessly with Radio Network System (RNS) 1320. RNS 1320 contains a Radio Network Controller (RNC) 1321 and one or more Node(s) B 1322. RNS 1320 may support one or more cells. RNS 1320 may also include one or more RNC 1321/Node B 1322 pairs or alternatively a single RNC 1321 may manage multiple Nodes B 1322. RNS 1320 is responsible for communicating with Mobile Station 1301 in its geographically defined area. RNC 1321 is responsible for controlling the Node(s) B 1322 that are connected to it and is a control element in a UMTS radio access network. RNC 1321 performs functions such as, but not limited to, load control, packet scheduling, handover control, security functions, as well as controlling Mobile Station 1301's access to the Core Network (CN) 1340.

The evolved UMTS Terrestrial Radio Access Network (E-UTRAN) 1330 is a radio access network that provides wireless data communications for Mobile Station 1301 and User Equipment 1302. E-UTRAN 1330 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1330 may include of series of logical network components such as E-UTRAN Node B (eNB) 1331 and E-UTRAN Node B (eNB) 1332. E-UTRAN 1330 may contain one or more eNBs. User Equipment 1302 may be any user device capable of connecting to E-UTRAN 1330 including, but not limited to, a personal computer, laptop, mobile device, wireless router, or other device capable of wireless connectivity to E-UTRAN 1330. The improved performance of the E-UTRAN 1330 relative to a typical UMTS network allows for increased bandwidth, spectral efficiency, and functionality including, but not limited to, voice, high-speed applications, large data transfer and IPTV, while still allowing for full mobility.

An example of a mobile data and communication service that may be implemented in the PLMN architecture described in FIG. 7 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1301 may communicate with any or all of BSS 1310, RNS 1320, or E-UTRAN 1330. In a illustrative system, each of BSS 1310, RNS 1320, and E-UTRAN 1330 may provide Mobile Station 1301 with access to Core Network 1340. The Core Network 1340 may include of a series of devices that route data and communications between end users. Core Network 1340 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 1341 is part of Core Network 1340, and interacts with Visitor Location Register (VLR) and Mobile-Services Switching Center (MSC) Server 1360 and Gateway MSC Server 1361 in order to facilitate Core Network 1340 resource control in the CS domain. Functions of CS-MGW 1341 include, but are not limited to, media conversion, bearer control, payload processing and other mobile network processing such as handover or anchoring. CS-MGW 1340 may receive connections to Mobile Station 1301 through BSS 1310, RNS 1320 or both.

Serving GPRS Support Node (SGSN) 1342 stores subscriber data regarding Mobile Station 1301 in order to facilitate network functionality. SGSN 1342 may store subscription information such as, but not limited to, the International Mobile Subscriber Identity (IMSI), temporary identities, or Packet Data Protocol (PDP) addresses. SGSN 1342 may also store location information such as, but not limited to, the Gateway GPRS Support Node (GGSN) 1344 address for each GGSN where an active PDP exists. GGSN 1344 may implement a location register function to store subscriber data it receives from SGSN 1342 such as subscription or location information.

Serving Gateway (S-GW) 1343 is an interface which provides connectivity between E-UTRAN 1330 and Core Network 1340. Functions of S-GW 1343 include, but are not limited to, packet routing, packet forwarding, transport level packet processing, event reporting to Policy and Charging Rules Function (PCRF) 1350, and mobility anchoring for inter-network mobility. PCRF 1350 uses information gathered from S-GW 1343, as well as other sources, to make applicable policy and charging decisions related to data flows, network resources and other network administration functions. Packet Data Network Gateway (PDN-GW) 1345 may provide user-to-services connectivity functionality including, but not limited to, network-wide mobility anchoring, bearer session anchoring and control, and IP address allocation for PS domain connections.

Home Subscriber Server (HSS) 1363 is a database for user information, and stores subscription data regarding Mobile Station 1301 or User Equipment 1302 for handling calls or data sessions. Networks may contain one HSS 1363 or more if additional resources are required. Exemplary data stored by HSS 1363 include, but is not limited to, user identification, numbering and addressing information, security information, or location information. HSS 1363 may also provide call or session establishment procedures in both the PS and CS domains.

The VLR/MSC Server 1360 provides user location functionality. When Mobile Station 1301 enters a new network location, it begins a registration procedure. A MSC Server for that location transfers the location information to the VLR for the area. A VLR and MSC Server may be located in the same computing environment, as is shown by VLR/MSC Server 1360, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1301 registration or procedures for handover of Mobile Station 1301 to a different section of the Core Network 1340. GMSC Server 1361 may serve as a connection to alternate GMSC Servers for other mobile stations in larger networks.

Equipment Identity Register (EIR) 1362 is a logical element which may store the International Mobile Equipment Identities (IMEI) for Mobile Station 1301. In a typical example, user equipment may be classified as either "white listed" or "black listed" depending on its status in the network. In one example, if Mobile Station 1301 is stolen and put to use by an unauthorized user, it may be registered as "black listed" in EIR 1362, preventing its use on the network. Mobility Management Entity (MME) 1364 is a control node which may track Mobile Station 1301 or User Equipment 1302 if the devices are idle. Additional functionality may include the ability of MME 1364 to contact an idle Mobile Station 1301 or User Equipment 1302 if retransmission of a previous session is required.

Figure 8:
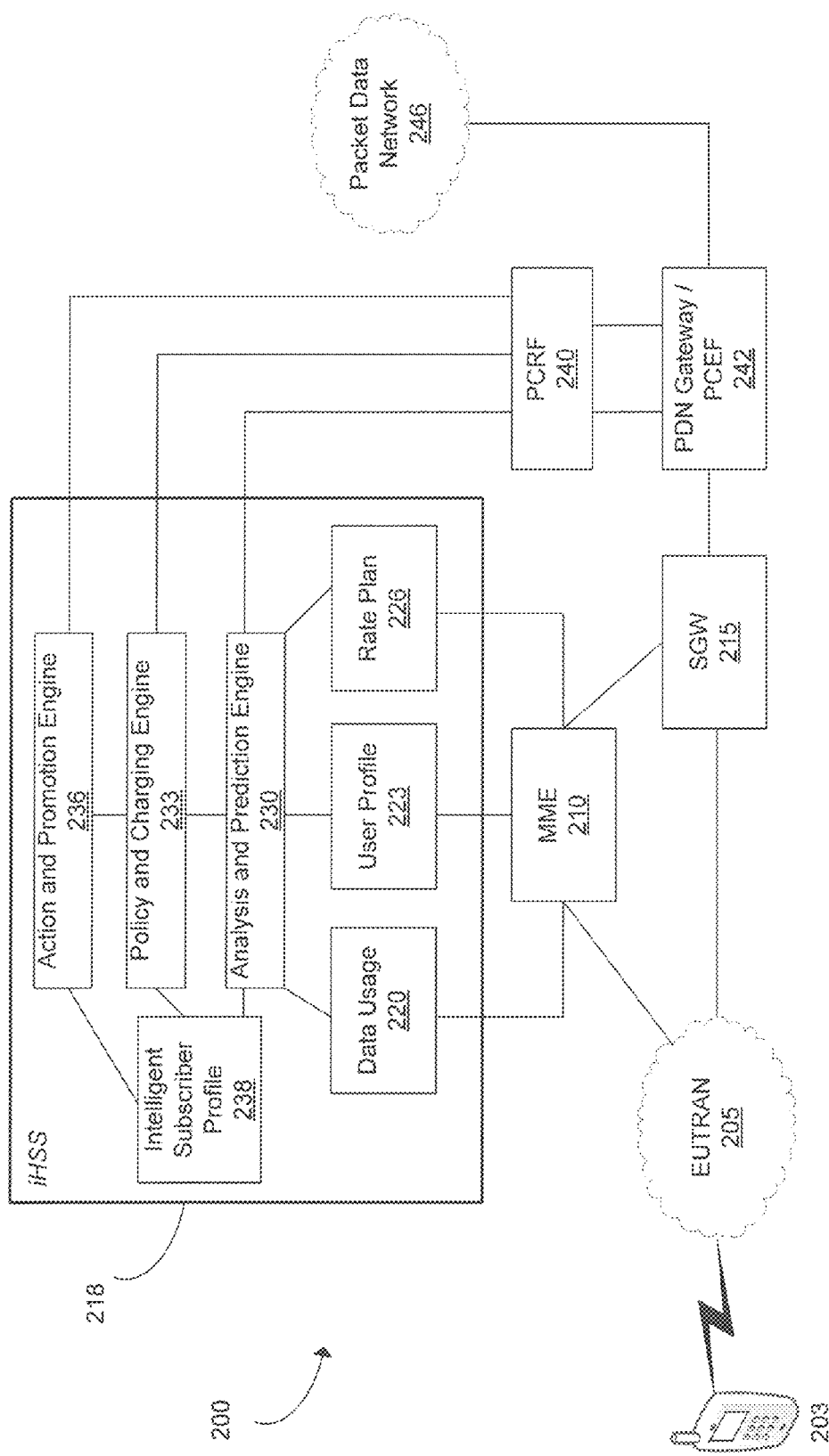
FIG. 8 illustrates a non-limiting exemplary architecture of a LTE network, in which one or more disclosed examples may be implemented.

FIG. 8 illustrates a non-limiting exemplary architecture of a LTE network, in which one or more disclosed examples may be implemented. As illustrated, network architecture 200 of FIG. 8 includes an Evolved Universal Terrestrial Radio Access Network (EUTRAN) 205, a MME 210, a SGW 215, an intelligent HSS 218, a PCRF 240, and a PDN gateway/Policy and Charging Enforcement Function (PCEF) 242. The PDN gateway 242 may provide a gateway between the LTE network and a public packet data network 246 which may comprise IP networks that connect to a cloud service or other data services. The different types of cloud services may include Infrastructure as a service (IaaS), Platform as a service (PaaS), Software as a service (SaaS), Storage as a service (STaaS), Security as a service (SE-CaaS), Data as a service (DaaS), Test environment as a service (TEaaS), Desktop as a service (DaaS), or application programming interface (API) as a service (APIaaS).

Intelligent HSS (iHSS) 218 may perform functions customary to an HSS such as AAA functions and subscriber location functions. In addition, intelligent HSS 218 may comprise an action and promotion engine 236, a policy engine 233, an analysis and prediction engine 230, and an intelligent subscriber profile 238. In an example, intelligent HSS 218 may also have data usage 220 for cloud services, user profile data 223, and rate plan data 226. Data usage 220 for cloud services may comprise information such as the time of day a particular type of cloud service was accessed, duration of cloud service access, volume of cloud service data accessed, provider of the cloud service, and the like. User Profile Data 223 may comprise general user preference data (e.g., phone model), wireless technology format capability (e.g., GPRS, LTE, WiFi, CDMA, etc.), user preferences for cloud services (e.g., preferred QoS for a cloud service), applications associated with the mobile device (e.g., social media application, cloud service application, radio application, music application, etc.), and common demographics of a user of a WTRU 203. The demographics may include user age, home ownership, employment status, gender, height, weight, birthday, college education status, income, and the like. Rate Plan Data 226 may comprise rate plan information such as whether the rate plan is time based, bulk data usage based, pay per use based, and the like.

One or more of the engines in the iHSS may use data usage 220, user profile data 223, and rate plan data 226. All engines may communicate instructions to PCRF 240 real-time as well as placing instructions and other information in the intelligent subscriber profile 238. The Prediction engine 230 may analyze data usage 220, user profile data 223, and rate plan data 226 to predict future behavior. The Policy and Charging Engine 230 may enforce quality of service (QoS) and charging to deliver superior user experience. The Action and Promotion Engine 236 may leverage coupon and campaign to promote usage of LTE cloud computing resources. The intelligent subscriber profile 238 may be similar to a user profile, but include the resulting analysis of the Action and Promotion Engine 236, Policy and Charging Engine 233, and Analysis and Prediction Engine 230. For example, the intelligent subscriber profile 238 may comprise time delineated forecasts (predictions) of usage patterns, recommended promotions and campaigns, time delineated network configuration for a connected WTRU, and the like.

Figure 9:
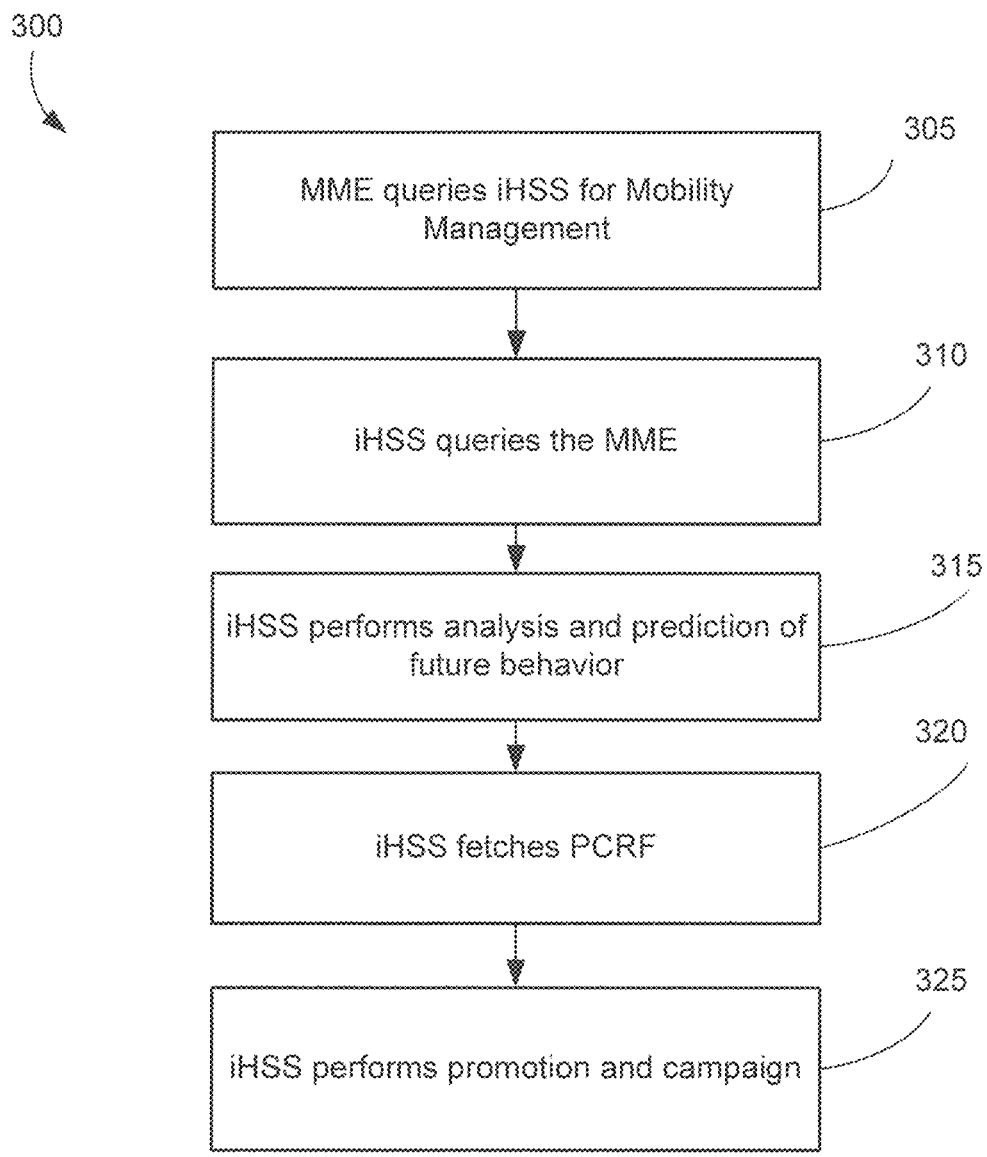
FIG. 9 illustrates a non-limiting exemplary method 300 of implementing one or more disclosed examples.

FIG. 9 illustrates a non-limiting exemplary method 300 of implementing one or more disclosed examples. In an example at block 305, a MME may query an iHSS for mobility management (e.g., authenticate a user identity). At block 310, the iHSS may query the MME for usage data and rate plan for the subscriber cloud service session. At block 315, the iHSS may perform analysis and prediction of future behavior based on past history of the user. At block 320, the iHSS may request the PCRF to retrieve policy and charging rules for the user. At block 325, the iHSS may perform promotion and campaign based on information gathered about the user data usage, user profile, rate plan, and the like. Performing promotion and campaign may include the iHSS communicating information that may encourage the user to expand the service mix of the user. An example service suggestion may be the purchase of a data plan that includes a provisioned (i.e., configured) tunnel to the cloud service network that allows the user a guaranteed end-to-end bandwidth.

The iHSS may perform real-time analysis (e.g., analysis during a cloud service session) so that intelligent subscriber profile information may be updated to the iHSS for future cloud services for the originating user device and the terminating cloud service device. A wide range of LTE network elements (e.g., MME, PCRF, PDN-GW, PCEF, etc.) may query the iHSS for intelligent subscriber profile information and be configured based on the intelligent subscriber profile. Interaction between LTE network elements (e.g., MME, PCEF, PCRF, etc.) and iHSS may occur prior to, during, and/or after the cloud service session.

Figure 10:
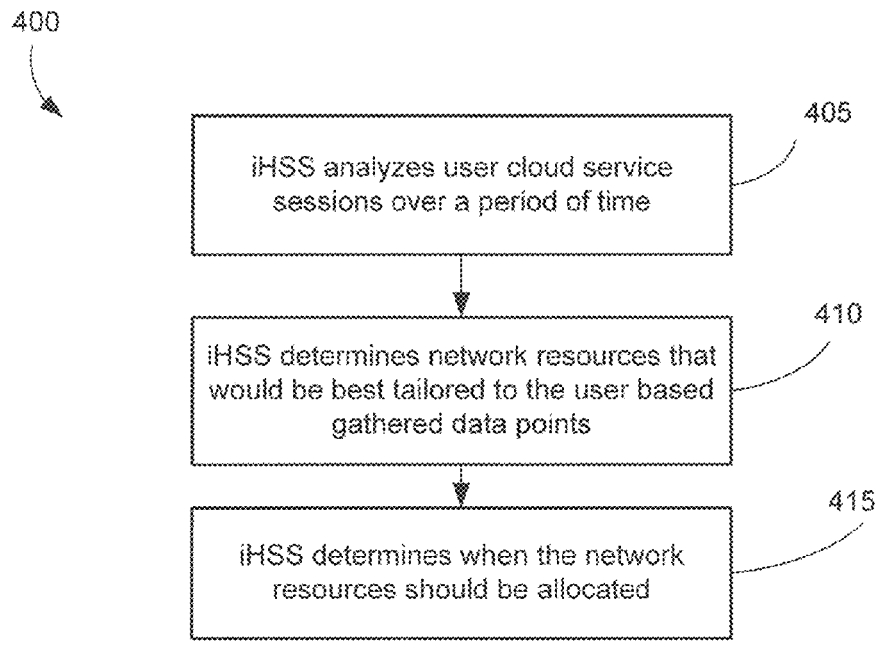
FIG. 10 illustrates a non-limiting exemplary method 400 of implementing one or more disclosed examples.

FIG. 10 illustrates a non-limiting exemplary method 400 of implementing one or more disclosed examples. In an example, at block 405 the iHSS may analyze several WTRU cloud service sessions data points gathered over a period of time. After analyzing the aforementioned cloud service sessions the iHSS may determine (i.e., predict) at block 410 the wireless resources (e.g., type and amount of wireless access) and other network resources (e.g., backbone network bandwidth and access to a wireless network) that would be best tailored to the WTRU cloud service session. Network resources may include number of wireless channels allocated, type of wireless technology (e.g., WiFi, GPRS, femtocell, LTE), amount of bandwidth, quality of service, network path, core or backbone network devices (wireless and wireline) as described herein, and the like. At block 415, the iHSS may decide when the aforementioned determined resources should be allocated. For example, the resources may be allocated immediately upon powering on the device, upon wake-up of the device after wireless inactivity or device inactivity, or during the cloud service session (e.g., throttling up or down of reserved bandwidth during the cloud service session).

The iHSS may analyze several different data points associated with the WTRU cloud service sessions such as the time of day for cloud service sessions and access to a particular cloud service. In another example, the user may be transitioned to a cell (e.g., wireless tower) earlier than normal based on historical WTRU information which was constructed into a probable (i.e., predicted) travel route for the WTRU. The predicted cell handover route may be pre-constructed by the Analysis and Prediction Engine of the iHSS and recorded within the intelligent subscriber profile. In an example, the cloud service provider may have an agreement with the wide are wireless network provider to configure the mobile phone customer device in a particular manner when accessing the cloud service provider's cloud services. Network access (including wireless access) may be configured based on the type of cloud service accessed.

Figure 11:
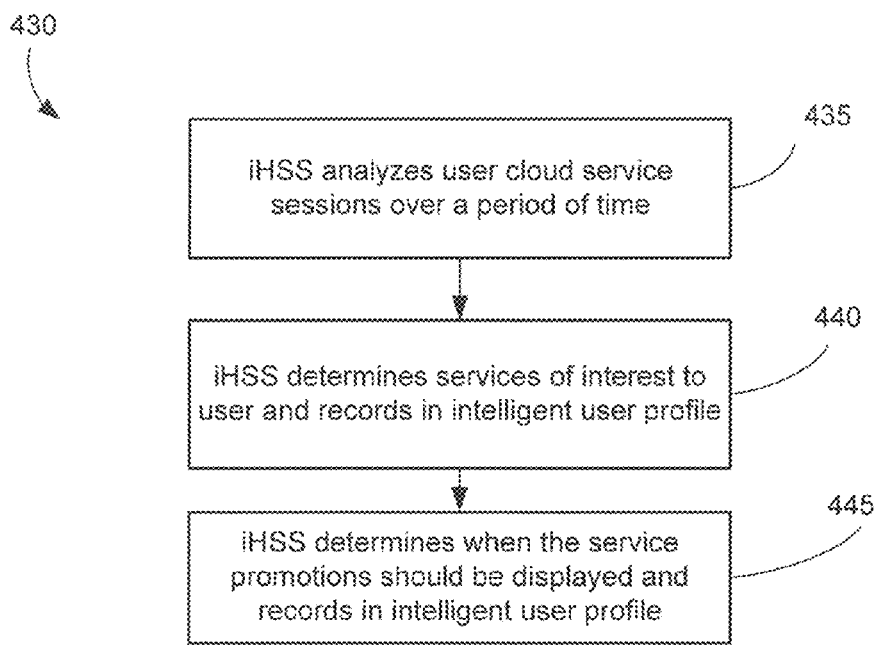
FIG. 11 illustrates a non-limiting exemplary method 430 of implementing one or more disclosed examples.

The iHSS may collaborate with LTE network elements (e.g., MME, PCRF, PDN-GW, etc.) to provide promotion and incentives for usage of cloud service resources. FIG. 11 illustrates a non-limiting exemplary method 430 of implementing one or more disclosed examples. In an example, as shown in method 430, at block 435 the iHSS may analyze several WTRU cloud service sessions. At block 440, after analyzing the aforementioned cloud service sessions the iHSS may determine data usage plans or other services that may be of interest to the WTRU user and record it into the intelligent subscriber profile associated with the WTRU. At block 445, the iHSS may determine when the aforementioned determined service promotions should be displayed and record it into the intelligent subscriber profile associated with the WTRU. For example, the resources may be displayed upon powering on the WTRU, upon wake-up of the WTRU after wireless inactivity, or during the cloud service session. In an example, aspects of the network may be pre-provisioned in anticipation of use by the WTRU user at a particular time. For example, the type of QoS may be pre-provisioned for a particular time frame that a WTRU of a user may access cloud services. In an example, based on data analysis as disclosed herein, an advertised paid service (e.g., data usage plan) may be selected immediately for a limited amount of time (e.g., only for the duration of a cloud service session). If the paid service is selected, the policy and charging engine may adjust the intelligent subscriber profile accordingly and the profile change may be communicated to the necessary network elements. In another example, based on data analysis as disclosed herein, there may be an advertisement or promotion for a cloud service. The cloud service promotion may be for a competitor cloud service with a lower price and comparable cloud services, for example.

It may be beneficial for the iHSS to handle the predictive analysis, intelligent subscriber profile changes, and different engines disclosed herein because the iHSS is one of the first network devices in the wireless network that may already be configured to assist in provisioning of a user device to connect to the wireless network. The iHSS allows for the upfront provisioning of appropriate resources upon a device's initial connection with the network. Intelligent HSS functionalities may also be housed in an HLR type device. Although cloud services are discussed, many of the disclosed concepts may be applied to other Internet, voice, or data network services. At least a portion of the intelligent subscriber profile created by the iHSS may be communicated to other network devices such as the MME, SGW, PDN-GW, PCRF, PCEF, or the like for implementation. The iHSS may analyze a particular device linked to a user or a group of devices that may be related to a common user account. The intelligent subscriber profile may be used to enhance cloud computing sessions. The intelligent subscriber profile may be automatically updated based on real time analysis. The analysis, gathering of data, and the like as disclosed herein may apply to a WTRU associated with a particular user account. So it is contemplated that a WTRU may be used for the first time, but an intelligent subscriber profile may be apply to the WTRU because of its association with a subscriber.

The intelligent subscriber profile and the other functions of the iHSS may be used in conjunction with navigation systems. As disclosed herein, the iHSS may analyze a user device usage pattern of a cloud service, Internet, or more generally data services. The iHSS may then predict a network configuration that is tailored to a WTRU or a WTRU associated with a subscriber account in a way that can be displayed to a device on a navigation map corresponding to text directions. The directions may be based on walking, driving, or other modes of transportation.

Figure 12:
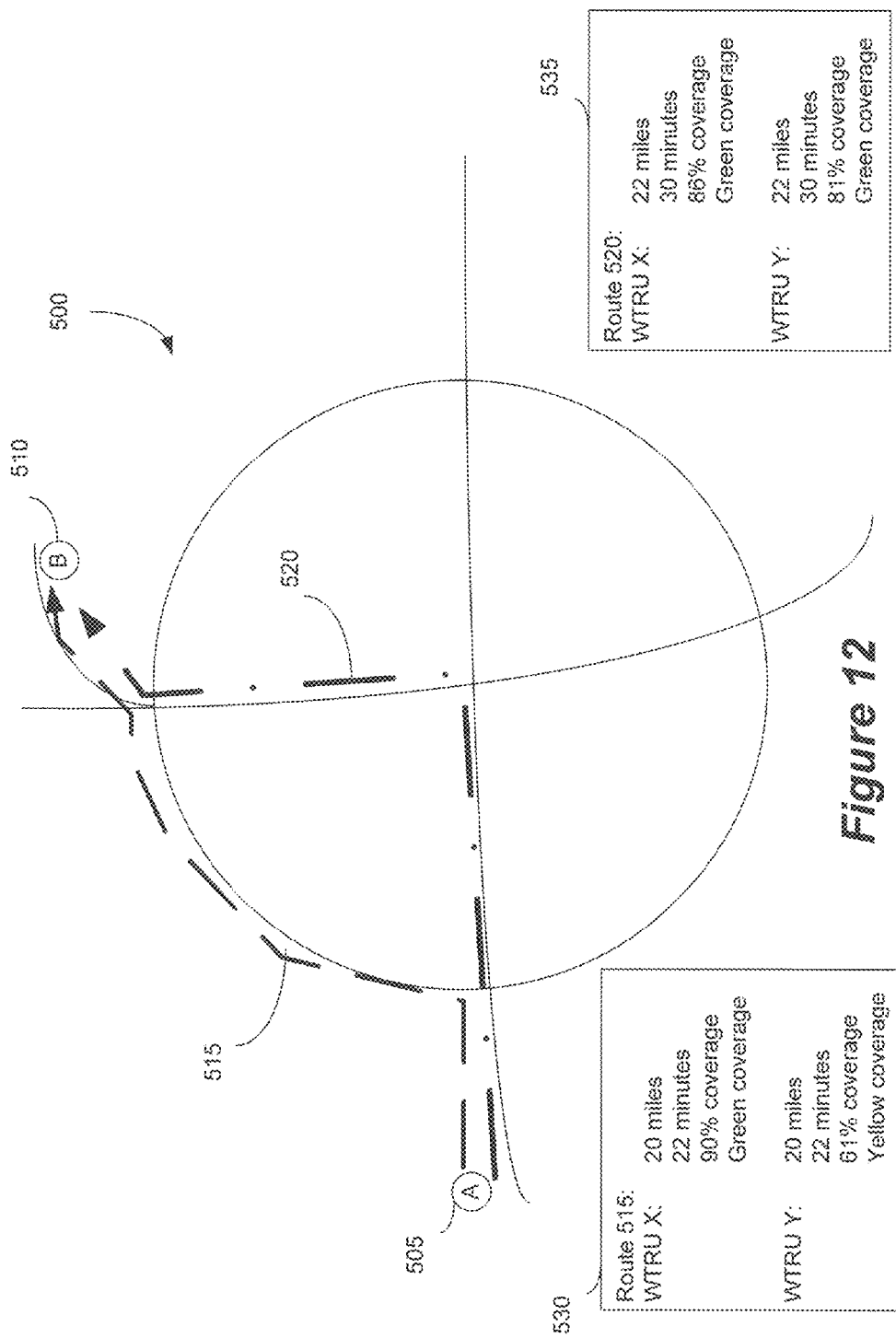
FIG. 12 illustrates a non-limiting exemplary map that displays a coverage prediction.

As shown in FIG. 12, in an example, User X with device WTRU X and User Y with device WTRU Y may intend to travel at the same time and in the same vehicle from Point A 505 to Point B 510 as show on highway map 500. User X may enter a request for directions from Point A 505 to Point B 510 on WTRU X or a device communicatively connected the WTRU X (e.g., a vehicle navigation system). User Y may also enter a request for directions from Point A 505 to Point B 510. In an example, the request for directions of one or more devices may be centralized. For example, the vehicle navigation system may be communicatively connected to both WTRU Y and WTRU X which may allow for the access of the necessary data to perform the necessary operations. The general navigation information may also comprise WTRU coverage information that may be based on analysis done by the iHSS (e.g., Analysis and Prediction Engine and/or intelligent subscriber profile).

As shown on highway map 500, there may be multiple routes from Point A 505 to Point B 510 such as Route 515 and a Route 520. As shown in block 530, the same mileage and time may be computed for WTRU X and WTRU Y, but different predicted coverages may be computed based on the respective devices intelligent subscriber profile. The predicted coverage may be an indicator of (or based on) one or more of the following: download/upload speeds, actual wireless antenna coverage, network congestion, network outages, network infrastructure (e.g., GSM or WiFi), and the like. The predicted coverage may also take into account the predicted speed of the WTRU (e.g., vehicle traffic or walking) to determine coverage scenarios.

As shown in block 530 for Route 515, WTRU X has a predicted coverage of 90% for the entirety of the route 515 while WTRU Y has a predicted coverage of 61%. Block 535 for Route 520 displays a predicted coverage of 86% for WTRU X and a predicted coverage of 81% for WTRU Y. Due to the importance of network access for entertainment (e.g., downloading high definition movies) or work purposes (e.g., accessing cloud services for work) route 520 which has a longer duration of 30 minutes, but has more stable predicted coverage, may be chosen over route 515 which has a shorter duration of 22 minutes. In an example, there may be color coded overage indicators for a route, as shown in block 530 and 535. In an example, color or other indicators may be overlaid onto highway map 500. The coverage indicators may be for an entire route or may be more granular to show coverage indicators for every mile, half mile, 5 minute timeframe, or the like. The indicators may be a graphic, text, or sound (e.g., voice or a tone). In an example, a user may be able to select multiple data usage scenarios/options during the route for navigation purposes. The multiple data usage scenarios (e.g., the top three scenarios) may be based on information from the intelligent subscriber profile. For example, the scenarios may be cloud Service 1, cloud Service 2, or Entertainment 1. The different scenarios may be an indicator of the type of protocol used, a descriptor of the end device accessed, or the like.

In an example, a predicted and/or a pre-constructed cell handover path for a WTRU may be based on the intelligent subscriber profile combined with information from a navigation system. Analysis of information associated with the expected route of a WTRU from the navigation system and usage information from the intelligent subscriber profile, for example, may allow the network to pre-construct when and to what towers the WTRU should use. This pre-construction may allow for quicker and more efficient handover between cell towers as well as the selection of the network cell towers that are optimal for the WTRU when traversing that route. For example, the selected cell towers may have higher bandwidth capacity, provide better voice call quality, and/or may have less congestion or errors. In an example, the selection of the radio towers used may be based on matching the predicted WTRU network resources with an objective of the service provider to conserve resources (e.g., map to 3G resources instead of 4G resources based on a prediction for voice only).

Figure 13:
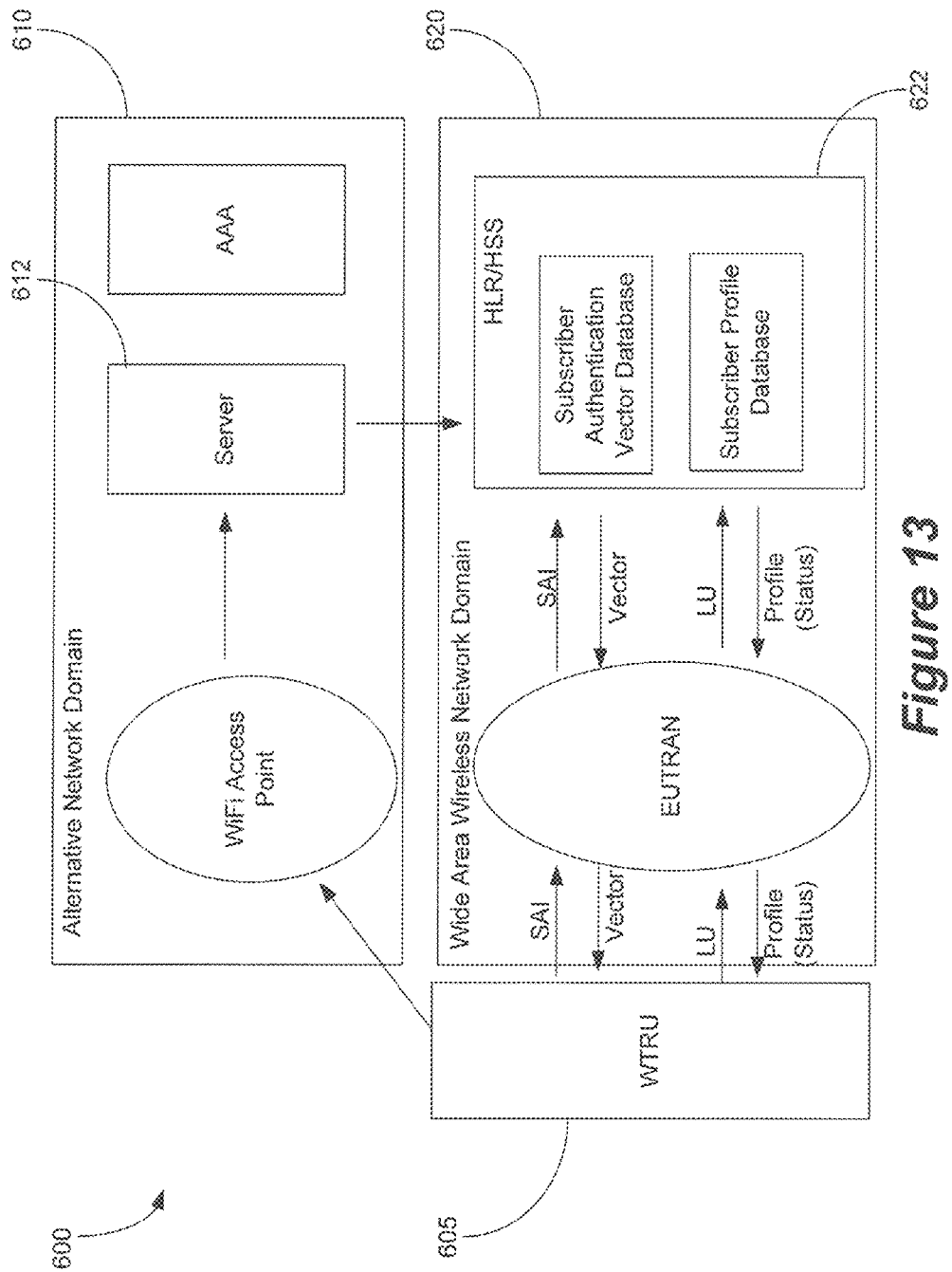
FIG. 13 illustrates a non-limiting exemplary network configuration comprising a wide area wireless network domain and an alternative network domain.
Figure 14:
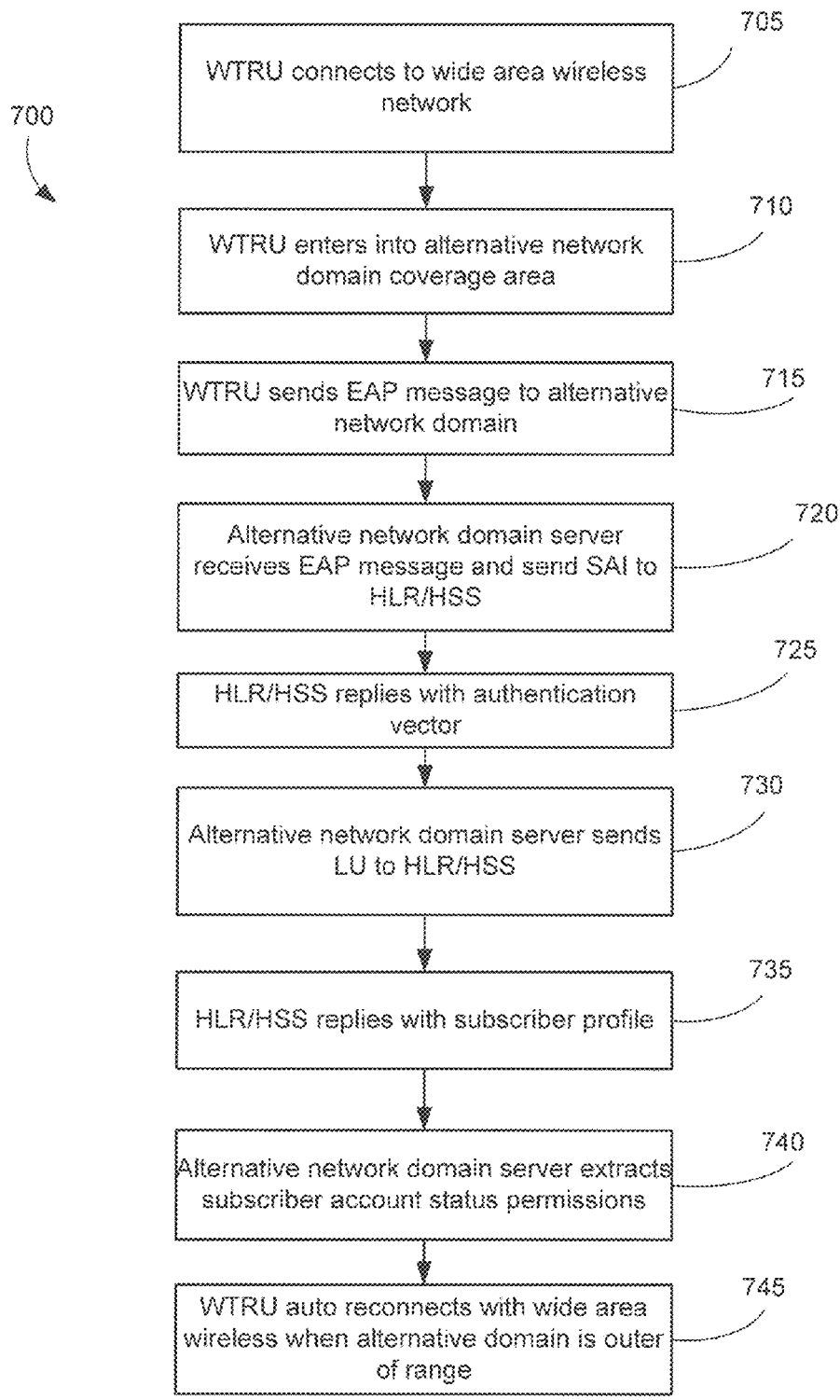
FIG. 14 illustrates a non-limiting exemplary method for switching between a wide area wireless network domain and an alternative network domain.

FIG. 13 illustrates a non-limiting exemplary network configuration 600 comprising a wide area wireless network domain 620 and an alternative network domain 610. FIG. 14 with reference to FIG. 13 illustrates a non-limiting exemplary method 700 for switching between a wide area wireless network domain 620 and an alternative network domain 610. At block 705, a WTRU 605 may be connected to wide area wireless network domain 620. At block 710, WTRU 605 may enter into an alternative network domain 610 coverage area. At block 715, WTRU 605 may send an extensible authentication protocol (EAP) message to the alternative network domain 610 (i.e., WiFi). At block 720, an alternative network domain server 612 (e.g., a network management device) may receive the message and send a Send Authentication Information (SAI) to HLR/HSS 622 in request for an authentication vector. At block 725, HLR/HSS 622 may reply with an authentication vector alternative network domain server 612. At block 730, alternative network domain server 622 may send a subsequent location updated (LU) to HLR/HSS 622 to request a subscriber profile for service authorization. At block 735, HLR/HSS 622 may reply with the subscriber profile. At block 740, alternative network domain server 612 may extract subscriber account status from the received subscriber profile in order to send permission right of usage of alternative network domain 610 to WTRU 605. At block 745, the WTRU 605 may auto reconnect with the wide area wireless network 620 and auto disconnect from the alternative network domain 610 when out of range of the alternative network domain 610.

Method 700 may reduce the amount of signaling traffic when switching between the alternative network domain and the wide area wireless network domain and reduce the HLR/HSS processing load. The wide area wireless network may instruct a connected WTRU to switch to an alternative network domain based on congestion or an outage in the wide area wireless network. The wide area wireless network may also trigger an alert to WTRU when the congestion and/or outage is relieved. In an example, wide area wireless network may instruct a connected WTRU to switch to an alternative network domain based on predictive switching. A WTRU may have an associated intelligent subscriber profile. Although the wide area wireless network may not have congestion at a period of time, the wide area wireless network may proactively signal to the WTRU to switch to an alternative network domain in consideration of a usage prediction from the intelligent subscriber profile.

When wireless networks become overly congested or encounters an outage, there is an opportunity to redirect the packet switched (PS) data traffic to an alternative network domain. Disclosed herein is an "integrated" Authentication and Authorization method that can be performed with reduced signaling (i.e., a single pass), so that the signaling traffic may be reduced.

Communications between the AAA server with an alternative network domain and the HLR/HSS inside the LTE network may use the signaling channel (e.g., SS7, SIGTRAN, etc.). Without an integrated AAA, a AAA server in the alternative network domain may make multiple queries to the HLR/HSS in the mobility network domain. Furthermore when there is no integrated AAA, the AAA sever may validate subscriber identity and verify account status each time the WTRU switches from the mobility domain to the alternative network domain.

In an example, there may be a single HLR/HSS solution for integrated ("one-stop") authentication and authorization. A server entitlement server query may perform Authorization and then the HLR/HSS SAI Query may be used perform authentication. The MIND and SAI query may avoid typical HLR/HSS authorization which requires the Location Update Request in order to return with the "entire" subscriber profile, which may be unnecessary and cumbersome. The method may comprise the client Box (or network management device) issuing a Lightweight Directory Access Protocol (LDAP) Authorization Request to reach the Subscriber Profile Repository (SPR)/service entitlement server database in order to retrieve subscriber account status. And then, only if the subscriber account is active, the HLR/HSS authentication may be performed.

Figure 15:
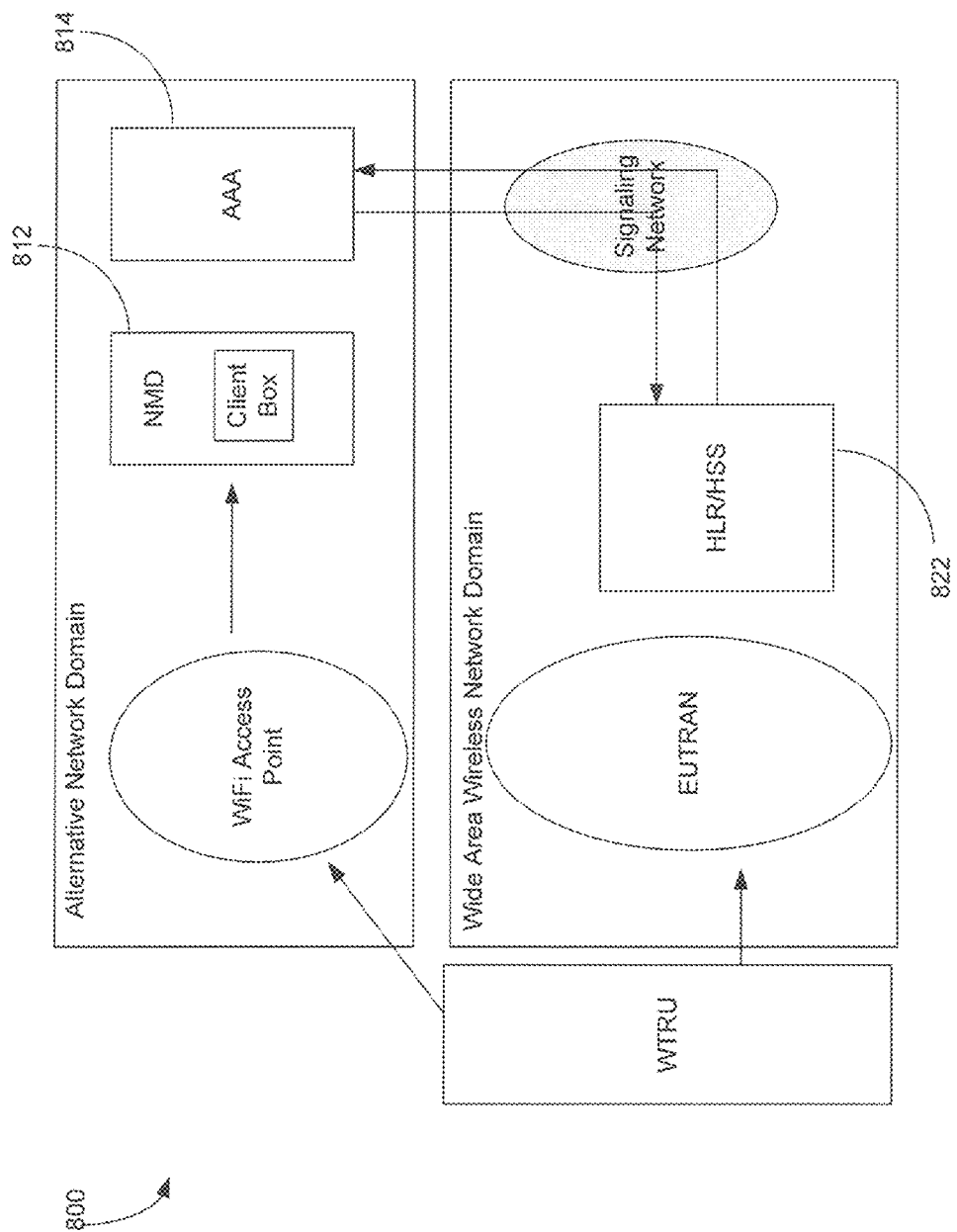
FIG. 15 illustrates a non-limiting exemplary network configuration 800 according to one or more disclosed examples.

FIG. 15 illustrates a non-limiting exemplary network configuration 800 according to one or more disclosed examples. Network management device (NMD) 812 may optimally direct signaling traffic to an appropriate regional HLR/HSS. In an example, the NMD 812 may extract Hot Spot Location info based on RADIUS attributes (e.g., NAS identifier, NAS IP address, location name, location iD, user name, etc.) in order to direct the SAI traffic to the appropriate HLR, HSS 822, or the like. The AAA device 814 may act as a nationwide backend server instead of a regional based server. In an example, since the HLR/HSS 822 already maintains multiple authentication vectors for each network as well as a subscriber profile, which may include account status, it may be more efficient for HLR/HSS 822 to simply include a single status flag which may is a single indicator for the account status for the account over multiple networks along with the authentication vector when replying to the SAI request.

Examples disclosed herein may use a wide area wireless network domain, an alternative network domain interchangeably in its implementation. For example, the wireless navigation maps as discussed herein may display information based on wide area wireless network domains, alternative network domains, or both. In another example, a trigger to switch networks may come from the alternative network domain rather than the wide area wireless network domain.

While examples for dynamic network domain interoperability, intelligent subscriber profiles, and the like have been described in connection with various communications devices and computing devices/processors, the underlying concepts can be applied to any communications or computing device, processor, or system capable of implementing the disclosed subject matter. The various techniques described herein may be implemented in connection with hardware or software or, where appropriate, with a combination of both. Thus, the methods and apparatuses for dynamic network domain interoperability, intelligent subscriber profiles, or certain aspects or portions thereof, can take the form of program code (i.e., instructions) embodied in tangible and/or non-transitory media, such as floppy diskettes, CD-ROMs, hard drives, or any other machine-readable storage medium, wherein, when the program code is loaded into and executed by a machine, such as a computer, the machine becomes an apparatus for the disclosed subject matter. A computer-readable storage medium, as described herein is an article of manufacture, and should not to be construed as a transient or propagating signal. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

Methods and systems disclosed herein may also be practiced via communications embodied in the form of program code that is transmitted over some transmission medium, such as over electrical wiring or cabling, through fiber optics, or via any other form of transmission, wherein, when the program code is received, loaded into, and executed by a machine, such as an EPROM, a gate array, a programmable logic device (PLD), a client computer, or the like, the machine becomes an apparatus for dynamic network domain interoperability, intelligent subscriber profiles, and the like. When implemented on a general-purpose processor, the program code combines with the processor to provide a unique apparatus that operates to invoke the functionality of the disclosed subject matter as described herein. Additionally, any storage techniques used in connection with dynamic network domain interoperability, intelligent subscriber profiles, or other disclosed subject matter may invariably be a combination of hardware and software.

While the disclosed subject matter has been described in connection with the various examples of the various figures, it is to be understood that other similar examples may be used or modifications and additions may be made to the described examples for performing the same function without deviating therefrom. For example, one skilled in the art will recognize intelligent subscriber profiles as described in the present application may apply to any environment, whether wired or wireless, and may be applied to any number of such devices connected via a communications network and interacting across the network. Therefore, dynamic network domain interoperability, intelligent subscriber profiles, or other disclosed subject matter should not be limited to any single example, but rather should be construed in breadth and scope in accordance with the appended claims.

What is claimed is:

1. A system comprising:
a mobile device that operates with a wireless network; and
a network device communicatively connected with the mobile device, the network device comprising:
a processor; and
a memory coupled with the processor, the memory comprising executable instructions that when executed by the processor cause the processor to effectuate operations comprising:
receiving a request for directions for the mobile device from a first location to a destination location;
based on the request for directions from the first location to the destination location, generating at least two different routes of travel for the mobile device from the first location to the destination location based on wireless coverage for the mobile device;
receiving an indication of a selection of a first route of travel of the at least two different routes of travel for the mobile device; and
providing directions associated with the selected first route of travel.

2. The system of claim 1, the operations further comprising providing instructions to configure a network resource for the mobile device based on the directions associated with the selected first route of travel.

3. The system of claim 1, wherein the generating of the first route of travel of the at least two different routes of travel is further based on a usage pattern of the mobile device.

4. The system of claim 1, wherein the generating of the first route of the at least two different routes of travel is further based on a usage pattern of the mobile device, wherein the usage pattern comprises a use of a cloud service.

5. The system of claim 1, wherein the request comprises information associated with a selection of a plurality of data usage scenarios for the mobile device.

6. The system of claim 1, the operations further comprising providing instructions to display the directions to the destination location and an indicator of a network configuration that is tailored to the mobile device along the first route of travel.

7. The system of claim 1, wherein the directions comprise a at least map within an indication of at least the first route.

8. The system of claim 1, wherein the generating at least two different routes of travel for the mobile device is based on network bandwidth of a network resource along the route.

9. The system of claim 1, wherein the request for directions comprises an indication of a mode of transportation.

10. The system of claim 1, wherein the generating at least two different routes of travel for the mobile device is based on speed of the mobile device.

11. An apparatus comprising:
a processor; and
a memory coupled with the processor, the memory comprising executable instructions that when executed by the processor cause the processor to effectuate operations comprising:
sending a request for directions from a first location to a destination location;
responsive to the request for directions from the first location to the destination location, receiving directions comprising at least two different routes of travel from the first location to the destination location, the directions based on wireless coverage associated with the apparatus; and
providing instructions to display the directions.

12. The apparatus of claim 11, wherein the request comprises information associated with data usage of the apparatus.

13. The apparatus of claim 11, the operations further comprising displaying an indicator of the wireless coverage for the apparatus along with the directions.

14. The apparatus of claim 11, wherein the directions comprise a at least map within an indication of the first route.

15. The apparatus of claim 11, the operations further comprising displaying an indicator of the wireless coverage for the apparatus along with the directions, wherein the indicator comprises at least one of text, a graphic, or sound.

16. The apparatus of claim 11, the operations further comprising receiving instructions to access an alternative network domain based on the wireless coverage.

17. The apparatus of claim 11, wherein the request for directions comprises an indication of walking or an indication of driving.

18. The apparatus of claim 11, wherein the request comprises information associated with a selection of a plurality of data usage scenarios.

19. A method comprising:
sending, by a processor, a request for directions from a first location to a destination location;
responsive to the request for directions to the destination, receiving, by the processor, directions comprising at least two different routes of travel for an apparatus from the first location to the destination location based on wireless coverage for the apparatus; and
providing, by the processor, instructions to display the directions.

20. The method claim 19, further comprising providing, by the processor, instructions to configure a network resource based on at least one of the at least two different routes of travel.

* * * * *